April 27, 1926.
E. F. CUMISKEY
1,582,249
CONNECTING ROD TRUING GAUGE
Filed April 26, 1922
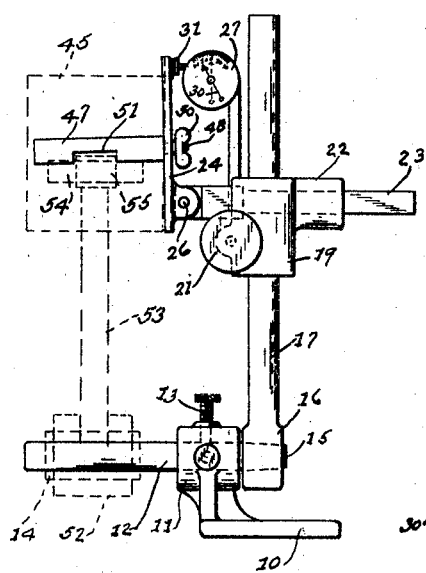
Edward F. Cumiskey
INVENTOR.
BY
Erwin, Wheeler & Woolard
ATTORNEYS.

Patented Apr. 27, 1926.

1,582,249

UNITED STATES PATENT OFFICE.

EDWARD F. CUMISKEY, OF MILWAUKEE, WISCONSIN.

CONNECTING-ROD TRUING GAUGE.

Application filed April 26, 1922. Serial No. 556,733.

*To all whom it may concern:*

Be it known that I, EDWARD F. CUMISKEY, a citizen of the United States, residing at Milwaukee, county of Milwaukee, and State of Wisconsin, have invented new and useful Improvements in Connecting-Rod Truing Gauges, of which the following is a specification.

This invention relates to improvements in gauges for testing the alinement of connecting rods and pistons.

Such gauges as have heretofore been used have included only a standard provided with a projecting pin adapted to receive the main connecting rod bearing, and a surface normal to the axis of said pin with which the piston might be alined. It has heretofore been necessary for the operator to sight between each piston and the surface supposed to correspond therewith in order to determine whether or not the alinement was correct. So far as I am aware, no means have heretofore been provided for determining with any degree of accuracy, the precise deviation of a connecting rod from the desired position.

It is the object of this invention to provide means for measuring accurately the alinement of connecting rods and pistons. More particularly it is an object of this invention to provide a device whereby the deflection of a piston wall from a position normal to the axis of the main connecting rod bearing may be measured in thousandths of an inch or less, means being provided for ascertaining the true deflection directly from an instrument provided for that purpose without sighting and without the use of other inaccurate methods. Obviously, where the amount of deflection is accurately known it can be more readily corrected than has heretofore been possible with the aid of devices wherein the deviation from true position of the connecting rod has been merely estimated.

It is a further object of this invention to provide means whereby the delicate recording instrument utilized in connection with this invention may be retracted out of the way during the mounting of the connecting rod upon the tool and may be brought into operative position without any need for fine adjustments on the part of the operator. The instrument is so designed that a reading can be had instantaneously, the contact plate being self alining with the wall of the piston, and the gauge being so designed that the position of the contact plate is instantly ascertainable at any time.

Further objects of this invention are to provide means for mounting the tool rigidly and securely upon a bench, or upon the wall while permitting the alinement or mounting of connecting rods upon the tool in a vertical position irrespective of the location of the base; to provide means for adjusting the tool to accommodate different sizes of connecting rods; and to enable the alinement of wrist pins also to be tested.

In the drawings:—

Figure 1 is a side elevation of a tool embodying this invention, a connecting rod, wrist pin, and piston being shown in dotted lines in the position in which they appear when applied to the tool for testing purposes.

Figure 2 is a front elevation of the tool.

Figure 3 is a rear elevation thereof.

Figure 4 is a view upon an enlarged scale showing the mounting of the contact plate and also showing exposed the interior of the delicate gauge, whereby the deflection from normal of the connecting rods is measured.

Figure 5 is a detail showing the interior of the gauge upon a section taken on line 5—5 of Fig. 4.

Like parts are identified by the same reference characters throughout the several views.

The base 10 of the tool is adapted to be secured either to a work-bench to the wall or in any other desired position. When secured to a bench it will appear as shown in full lines in Fig. 2, and when secured to a wall or a vertical surface it will appear as shown in dotted lines in said figure.

The base includes a sleeve 11 which is bored to receive the pin 12. A set screw 13 is provided for securing pin 12 against rotation in sleeve 11. Pin 12 serves as a mounting for the main connecting rod bearings. Since such bearings ordinarily vary in size it is customary to provide interchangeable bushings shown in dotted lines at 14, each of which is provided with a central opening whereby it may be received upon pin 12. The diameters of the bushings vary to correspond with the internal diameter of the main bearing of the connecting rod to be mounted thereon. It will be understood to be sufficient for the purposes of this invention, however, that means is provided for mounting rigidly a main connecting rod bearing upon pin 12.

Pin 12 projects through the sleeve 11 carried by base 10, and is preferably tapered at its end 15 or is provided with a key or other well known means, whereby the collar 16 integral with upright 17 may be secured upon said pin.

The upright 17 may be square or may be provided as shown in Fig. 3 with a longitudinally extending slot 18 adapted to accommodate and guide a key or internal projection in the sleeve 19 which is slidable vertically upon upright 17. The sleeve 19 may be provided with a set screw for securing it at the desired height upon upright 17, or may as shown in the drawings, be split longitudinally upon one side of its axis and may be provided with a clamping screw 20 having a narrow head 21, whereby the two sides of the sleeve may be clamped together about the upright 17, thereby securing the sleeve against movement with respect to the upright.

Sleeve 19 carries an integral, laterally, extending ear 22 in which a square opening is formed to receive the horizontally disposed, squared shaft 23. These elements are preferably so constructed that the squared shaft 23 will be freely movable axially through the ear 22, but will be supported thereby without perceptible freedom of lateral movement. To this end, that element which has been designated as "ear 22" is extended as shown in Fig. 1 to constitute in reality a horizontally disposed sleeve providing an extended bearing for the squared shaft 23.

At the inner end of shaft 23 is pivoted the contact plate 24. This plate is preferably provided with integral ears 25 which are secured to the reduced end portion of shaft 23 by a pin 26. It will be noted that plate 24 is disposed in close proximity to the squared end of shaft 23, and is thereby secured against excessive oscillation in either direction about the pivot pin 26.

The gauge 27 is carried by a vertical post 28 which is secured in any desired manner to shaft 23. Preferably the post is received, as shown, into an opening bored in said shaft and is secured therein by a set screw 29 or in any suitable manner. The face plate of gauge 27 is provided with a scale, each division line of which may represent one thousandth of an inch or other suitable linear or angular unit of measurement. A pointer 30 is movable about the face plate of the gauge, and is adapted to indicate upon the scale the distance travelled by the gauge head 31.

It is immaterial to this invention what construction is followed in the manufacture of the instrument herein designated as a gauge. Such instruments are well known and can be obtained complete upon the market. For the purpose, however, of rendering this disclosure complete, means is shown herein for transmitting to the pointer 30 the movement of the gauge head 31, whereby the distance of such movement may be read upon the scale.

The gauge 27 is provided in its upper portion with a rod 32 provided at its inner end with a rack 33, and terminating at its outer end in the gauge head 31. The rack 33 is engaged with a pinion 34 of relatively large size which, in turn, meshes with a small pinion 57 on shaft 58 which also carries pinion 56. Pinion 56 is meshed with small pinion 35 mounted upon a shaft 36 which carries internally a revoluble disk 37 and externally the pointer 30. The spring 38 is secured at its outer end to a stud 39 which may be mounted upon some relatively immovable portion of the casing, such for example, as the internal plate 40 thereof. The inner end of said spring is secured to a stud 41 which is carried by disk 37 mounted upon shaft 36. The arrangement is such that a comparatively slight movement of the gauge head 31 will produce a comparatively large movement in the point of needle 30, thereby rendering the position of the gauge head readily discernible.

The spring 38 is preferably so adjusted that the needle or pointer 30 will normally occupy the position in which it appears in Fig. 1. This position of the needle indicates that the gauge head 31 is positioned twenty or thirty thousandths of an inch to the left of the position wherein the pointer would register zero at the top of the gauge.

It will be noted that the contact plate 24 extends both upwardly and downwardly from its pivot point 26. It follows that when plate 24 is brought into contact with a piston, rotative moment is provided, whereby the pressure of the piston wall upon the plate at either side of the pivot point 26 will cause said plate to oscillate upon its pivot and conform throughout its length to the piston wall. The contact plate, however, is normally inclined to the left, being maintained in that position by the gauge head 31 which seats against the plate itself or against a button 46 which may be formed thereon.

For the purpose of testing the accuracy of alinement of wrist pins, I provide a removable arm 47 having at one end a threaded screw 48 receivable into an opening 49 in contact plate 24, whereby the arm 47 can be screwed in position upon the contact plate by means of a wing nut 50. The lower surface of arm 47 is normal to the plane of the contact plate 24, and is recessed at 51 as shown to receive the wrist pin bearing of the connecting rod. It will be understood that the arm 47 is normally detached from the remainder of the device and is used only in testing alinement of wrist pins.

The operation of this device is as follows:

The base 10 is secured to any desired support upon a bench or wall as may be convenient. The projecting pin 12 is thereupon adjusted by loosening set screw 13 to position the upright 17 vertically. A suitable bushing 14 is now mounted upon the pin 12, and the main bearing 52 of connecting rod 53 is mounted upon said bushing. It will be understood that the piston 45 is ordinarily attached to the connecting rod during alinement tests.

The sleeve 19 is now moved upwardly or downwardly upon upright 17, and is positioned thereon by tightening the clamping screw 20 to secure the operating portions of the device at a proper height for engagement with the walls of piston 45.

It will be understood that this instrument is adapted to give readings of a high degree of accuracy when the several elements which comprise the instrument are accurately constructed and designed. The arrangement is such that when the contact plate 24 occupies a position exactly normal to the axis of pin 12, the pointer 30 carried by gauge 27 should stand at zero. A deviation of the pointer in either direction from the zero position at the top of the gauge represents a corresponding movement of the gauge head 31 and the upper end of contact plate 24. As has previously been stated, the spring 38 normally operates to maintain the gauge head 31, and the upper end of plate 24 in a position removed by approximately twenty to thirty thousandths of an inch from the position which these members would occupy if the contact plate were in its true normal relation to pin 12.

The connecting rod 53 and piston 45 being positioned upon pin 12, the contact plate 24 will be brought into operation by manually sliding shaft 23 to the left as shown in Figs. 1 and 4. The contact plate being inclined normally to the left, it is probable that the upper portion of the piston 45 will first contact with plate 24. The sliding movement of shaft 23 being continued plate 24 will assume a position of contact throughout its length with piston 45 and immediately the deviation from normal of the wall of the piston can be read by referring to the indicator 30 and the position thereof upon the face of gauge 27.

Ordinarily the disalinement of the connecting rod and piston assembly takes place in the connecting rod itself, which becomes bent in some manner. It is, therefore, usual that when the gauge 27 shows the face of piston 45 to deviate from its natural position of perpendicularity with respect to the pin 12 the trouble will be found in the connecting rod. Occasionally, however, it becomes desirable to test the alinement of the wrist pin 54, and for this purpose the arm 47 is used.

To test the alinement of the wrist pin, the connecting rod is mounted upon pin 12 as before, but the piston is removed from the upper end of the connecting rod. The arm 47 being in place in the manner above described, the connecting rod is swung about its pivot upon pin 12 to a vertical position when the upper connecting rod bearing 55 will be received into recess 51 in arm 47, and the laterally extending portions of pin 54 will contact with the lower edge of arm 47. It will be understood that if the upper edge of the wrist pin (and the lower edge of arm 47) are parallel and true with respect to the axis of pin 12, the pointer 30 upon gauge 27 will read zero. Correspondingly, a deviation in either direction will be indicated by the gauge.

Obviously the device disclosed herein constitutes a simple and effective mechanism for reading instantly and accurately the amount of deviation of a connecting rod from true alinement. An important result achieved in the operation of this tool is that skill is no longer necessary to ascertain the amount of such deviation, and that consequently the correction of mis-alined connecting rod and piston assemblies is greatly simplified.

I claim:

1. A tool for testing the alignment of connecting rods and pistons, said tool including a pin adapted to receive and support the main bearing of a connecting rod, a standard having its greatest length disposed transversely to the axis of said pin, and a gauge device longitudinally adjustable upon said standard and including a pivoted straight edge and an instrument adapted to measure the deviation of said straight edge from a line normal to the axis of said pin.

2. A tool for testing the alignment of connecting rods and pistons, said tool including means for supporting a connecting rod in a predetermined position, a standard projecting from said means, an arm projecting laterally from said standard and vertically adjustable thereon, a straight edge having a pivotal connection adjacent an end with said arm, and an instrument mounted upon said arm and provided with a portion abutting the opposite end of said straight edge, said instrument being adapted to measure the deflection of said straight edge.

3. A tool for testing the alignment of connecting rods and pistons, said tool including a pin and adapted to receive a connecting rod bearing, a standard extending upwardly above said pin, a head providing two slide ways at right angles to each other, one of said slide ways being associated with the standard for vertical movement thereon, an arm slidable in the second slide way transversely of said standard, a straight edge pivotally connected with said arm, and a deflection measuring instrument disposed between an oscillatory portion of said straight edge and a relatively fixed portion of said arm, said instrument being calibrated to measure the deflection of said straight edge from a line normal to said pin.

4. A tool for testing the alignment of connecting rods and pistons, said tool including an apertured base, a pin projecting therefrom and adjustable therethrough, a standard transversely apertured to receive said pin and mounted thereon, and means adjustably supported from said standard for measuring the deflection of a piston from a line normal to said pin.

5. A tool for testing the alignment of connecting rods and pistons, said tool including a pin providing a support for a connecting rod bearing, a standard extending upwardly above said pin, a head including a pair of sleeves, one of said sleeves being slidable upon said standard, means for clamping said last mentioned sleeve in adjustment thereon, an arm transversely slidable with respect to the standard through the other of said sleeves, and a straight edge pivoted to said arm and provided with an instrument for registering its deflection with respect thereto.

6. A tool for testing the alignment of connecting rods and pistons, said tool including means for supporting the main bearing of a connecting rod in a predetermined position, an arm adjustable to and from said means in parallelism therewith, a straight edge pivotally connected with said arm, an instrument lying between said straight edge and said arm and adapted to measure the deflection of said straight edge with respect to a line normal to said arm, and means detachably connected with said straight edge and providing a second straight edge normal to said first mentioned straight edge, whereby the alignment of a wrist pin bearing with respect to the main bearing of a connecting rod may be ascertained.

7. A tool for testing the alinement of connecting rods and pistons including a pin arranged to support the main bearing of a connecting rod, a standard associated with the pin, a bearing member mounted upon the standard, an arm slidable through the bearing member transversely of the standard, a plate pivotally secured to the arm, and a gauge supported from said arm and associated with said plate at a point other than the pivotal axis thereof, said gauge being adapted to register the amount of movement of said plate about its pivotal axis.

8. A tool including a projecting pin, a standard connected to said pin and having its length disposed at right angles to said pin, an arm disposed transversely of said standard and adjustable transversely and longitudinally thereon, a plate pivotally movable with respect to said arm, and a gauge arranged to measure the movement of an oscillatory portion of said plate with respect to said arm.

9. A testing tool for connecting rods including means for supporting a connecting rod, a pivotally mounted plate, a gauge adapted to register deviation from a predetermined central position of said plate, and a removable arm adapted for association with said plate, the lower margin of said arm being normal to the face of the plate and being recessed for the accommodation of the wrist pin bearing of a connecting rod, said plate and gauge being supported from said supporting means.

10. A testing tool for connecting rods, said tool comprising a standard having a base, a pin projecting from said standard and adapted to support a connecting rod therefrom, an arm longitudinally and laterally movable with respect to the standard, a straight edge supported from said arm and means secured to said arm for registering in units of distance any deviation from a predetermined position of said straight edge of a connecting rod mounted on said pin.

EDWARD F. CUMISKEY.